United States Patent
Yan et al.

(10) Patent No.: US 7,584,239 B1
(45) Date of Patent: Sep. 1, 2009

(54) SYSTEM ARCHITECTURE FOR WIDE-AREA WORKSTATION MANAGEMENT

(75) Inventors: Yong Yan, Fremont, CA (US); Rajendra Kumar, Los Altos, CA (US); Roland Hochmuth, Fort Collins, CO (US); Bruce Blaho, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 10/431,063

(22) Filed: May 6, 2003

(51) Int. Cl.
  *G06F 15/16* (2006.01)
(52) U.S. Cl. .................. 709/201; 709/202; 709/212; 709/216; 709/214; 718/1; 718/100; 718/106; 718/102
(58) Field of Classification Search ......... 709/201–203, 709/212, 214, 216, 217–219, 200; 718/1, 718/100, 106, 102
See application file for complete search history.

(56) References Cited

U.S. PATENT DOCUMENTS

| | | | | |
|---|---|---|---|---|
| 6,469,901 B1* | 10/2002 | Costner | ................... | 361/730 |
| 6,573,907 B1* | 6/2003 | Madrane | ................... | 715/719 |
| 6,633,962 B1* | 10/2003 | Burton et al. | ................ | 711/163 |
| 6,643,650 B1* | 11/2003 | Slaughter et al. | .............. | 707/10 |
| 6,671,721 B1* | 12/2003 | Branson et al. | ............. | 709/224 |
| 6,735,601 B1* | 5/2004 | Subrahmanyam | ........... | 707/200 |
| 7,107,267 B2* | 9/2006 | Taylor | ........................... | 707/8 |
| 7,146,233 B2* | 12/2006 | Aziz et al. | ................... | 700/101 |
| 7,441,108 B2* | 10/2008 | Fisher et al. | ................. | 712/227 |
| 7,475,419 B1* | 1/2009 | Basu et al. | ...................... | 726/2 |
| 2002/0097563 A1* | 7/2002 | Costner | ...................... | 361/735 |
| 2004/0098447 A1* | 5/2004 | Verbeke et al. | .............. | 709/201 |
| 2004/0148326 A1* | 7/2004 | Nadgir et al. | ................ | 709/200 |

OTHER PUBLICATIONS

Parallel Generic Algorithms and sequencing Optimisation, by Mariusz Nowostawski, The university of Birmingham UK, May 23, 1998, pp. 1-32.*
Scheduling Parallel Applications in distributed networks, by Jon B. Weissman and Xin Zhao, Baltzer publishers, 1998, pp. 109-118.*
Mainwaring and Culler, "Design Challenges of Virtual Networks: Fast, General-Purpose Communication".
Foster, Kesselman and Tuecke, "The Anatomy of the Grid" Intl. J. Supercomputer Applications, 2001, pp. 1-25.
Krauter, Buyya, and Maheswaran, "A Taxonomy and Survey of Grid Resource Management Systems" pp. 1-30.

* cited by examiner

*Primary Examiner*—Nathan J Flynn
*Assistant Examiner*—Mohammad A Siddiqi (57) ABSTRACT

A system architecture for managing a group of heterogeneous workstations that may be widely dispersed geographically. A system according to the present teachings enables users to access remote workstations and run applications on the remote workstations transparently and enables seamless integration of remote desktop sharing and distributing desktops among heterogeneous workstations. The system also provides enforcement of protections among user and workstations, user account management and workstation allocation management. The present architecture is platform independent and enables workstations to be accessed from anywhere using a graphical user interface through the Internet.

23 Claims, 5 Drawing Sheets

SYSTEM ARCHITECTURE FOR WIDE-AREA WORKSTATION MANAGEMENT

BACKGROUND OF THE INVENTION

1. Field of Invention

The present invention pertains to the field of workstation management. More particularly, this invention relates to a system architecture for wide-area workstation management.

2. Art Background

A variety of workstations exist that provide users with the capability of executing a wide variety of applications. Examples of workstations are numerous and includes workstations implemented according to a variety of heterogeneous computing platforms. A computing platform is typically characterized by a particular variety of operation system and/or processor architecture. Examples of workstation platforms include Windows platforms, Macintosh platforms, Unix platforms, etc.

It is often desirable to enable users of workstations to access the resources of other workstations. For example, it is often desirable to enable a user of one workstation to access files and run applications that reside on other workstations. The acts of accessing files, applications, or other resources on other workstations may be referred to as workstation sharing. It may also be desirable to provide workstation sharing among heterogeneous workstations that are widely distributed geographically.

Some prior systems for providing workstation sharing are highly platform-dependent. Such systems usually are not readily adaptable for sharing among heterogeneous workstations, i.e. workstations that implement different computing platforms. Other prior systems for providing workstation sharing may not support sharing among workstations that are widely distributed geographically.

SUMMARY OF THE INVENTION

A system architecture is disclosed for managing a group of heterogeneous workstations that may be widely dispersed geographically. A system according to the present teachings enables users to access remote workstations and run applications on the remote workstations transparently and enables seamless integration of remote desktop sharing and distributing desktops among heterogeneous workstations. The system also provides enforcement of protections among user and workstations, user account management and workstation allocation management. The present architecture is platform independent and enables workstations to be accessed from anywhere using a graphical user interface through the Internet.

A system according to the present techniques includes a set of workstations and a set of workstation sharing agents that execute under virtual machines that run on the workstations. The system further includes a management server that enables the workstation agents to form a workstation sharing pool among the workstations and share desktops and files and applications.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
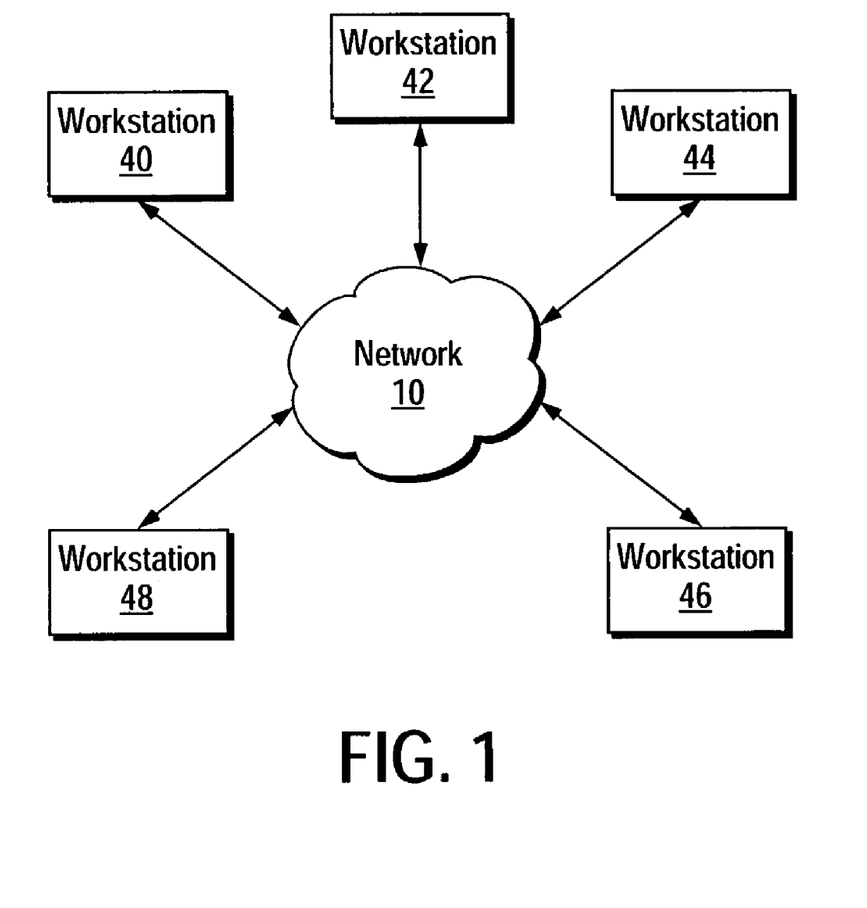
FIG. 1 shows a set of workstations that are capable of communication via a network.

FIG. 1 shows a set of workstations 40-48 that are capable of communication via a network 10. The workstations 40-48 may include any number of workstations. The workstations 40-48 may include a variety of different computing platforms. The different computing platforms may be characterized by different operating systems and/or different processor architectures. The workstations 40-48 may be widely dispersed geographically. The network 10 may represent the world-wide-web of the Internet or other networks that support Internet protocols or a combinations of networks.

The workstations 40-48 execute workstation sharing agents and management components for coalescing the workstations 40-48 into a workstation sharing pool. The workstation sharing agents and management components enable users of the workstations 40-48 to access remote workstations in the workstation sharing pool and run applications on the remote workstations in the workstation sharing pool transparently. The workstation sharing agents and management components enable seamless integration of remote desktop sharing among the workstations 40-48 and distribution of desktops among the workstations 40-48 in a platform independent manner. The workstation sharing agents and management components enable any of the workstations 40-48 to be accessed from anywhere using a GUI interface via the network 10.

The workstation sharing agents and management components are implemented in cross-platform code that is readily executable on a variety of heterogeneous computing platforms. In one embodiment, the workstation sharing agents and management components are implemented in Java code and each of the workstations 40-48 includes a Java virtual machine that support these components.

Figure 2:
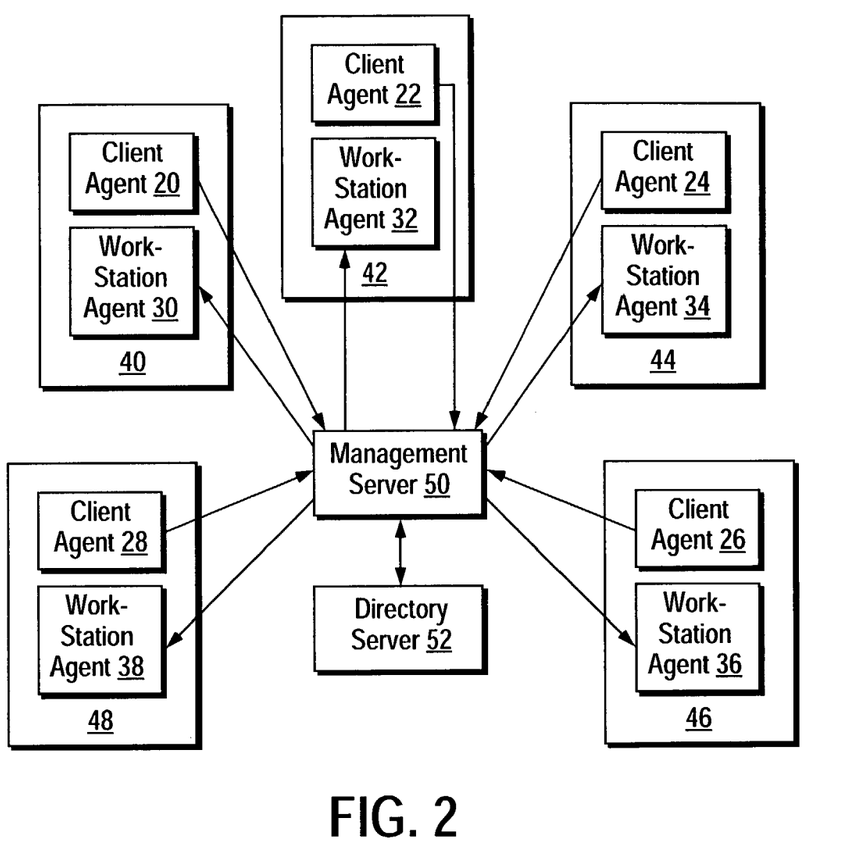
FIG. 2 shows a set of workstation sharing agents and management components according to the present teachings.

FIG. 2 shows one embodiment of the workstation sharing agents and management components in the workstations 40-48 according to the present teachings. The management components include a management server 50 and a directory server 52 and the workstation sharing agents include a set of client agents 20-28 and a set of workstation agents 30-38. The client agents 20-28 and the workstation agents 30-38 run on the workstations 40-48, respectively. The management server 50 and the directory server 52 may run on any one or more of the workstations 40-48 or on a separate workstation. In addition, any of the workstations 40-48 may run more than one client agent and more than one workstation agent.

The client agents 20-28 obtain user inputs and remote access requests from the users of the corresponding workstations 40-48. In addition, the client agents 20-28 communicate the remote access requests to the management server 50. If a client agent and the management server 50 are deployed on different workstations then that client agent and the management server 50 communicate via the network 10 using Internet protocols that support high-level application-interoperable protocols such as SOAP and http. If a client agent and the management server 50 are deployed on the same workstation then that client agent and the management server 50 communicate using internal calling mechanisms.

The workstation agents 30-38 have the capability to provide access to the corresponding workstations 40-48 in the workstation sharing pool. The workstations agents 30-38 enable invocation of remote applications and sharing of desktop information among the workstations 40-48 in the workstation sharing pool. The workstation agents 30-38 also have the capability of enforcing workstation protection and monitoring.

The client agents 20-28 have the capability of accepting remote desktop information obtained from the workstation agents 30-38 and sending results back to the corresponding users. For example, the client agent 20 has the capability of accepting remote desktop information from any one or more of the workstation agents 32-38, respectively, and displaying the obtained remote desktop on a local display of the workstation 40.

In one embodiment, remote desktop information is transferred between the workstation agents 30-38 and the client agents 20-28 via the network 10 using a virtual network computing (VNC)-like protocol. A VNC-like protocol enables the transfer of frame buffer information from the workstation agents 30-38 to the client agents 20-28 and the transfer of user input information from the client agents 20-28 to the workstation agents 30-38 via the network 10.

The management server 50 authenticates user requests obtained from the client agents 20-28. The management server 50 manages user accounts and registration of the client workstations 40-48 into the workstation sharing pool. The management server 50 allocates the workstations 40-48 in the workstation sharing pool in response to user requests, controls user access sessions and remote desktop sharing, and enforces access and workstation protection.

The directory server 52 is an information repository for persistently maintaining user and workstation information.

Each client agent 20-28 provides a graphical user interface (GUI) to users of the corresponding workstation 40-48. In one embodiment, the client agents 20-28 generate a graphical user interface using the Java-swing technique.

In one embodiment, the graphical user interfaces generated by the client agents 20-28 include a main manual bar and a main table window. The main manual bar has three dropdown manuals that include a file manual, a service manual, and an admin manual.

The file manual provides a set of selection functions including a FILE COPY selection and an EXIT selection. The FILE COPY selection enables a user to transfer files between any two of the workstations 40-48 in the workstation sharing pool. The EXIT selection enables the user to exit the workstation sharing system.

The service manual provides a set of selection functions including a CHECK-IN selection, a CHECK-OUT selection, an ACCESS selection, a STOP-ACCESS selection, a DELEGATION selection, a STOP DELEGATION selection, and a GET-ALL selection. The CHECK-IN selection enables a user to check a workstation into the workstation sharing pool. The CHECK-OUT selection enables a user to check out a workstation from the workstation sharing pool.

The ACCESS selection of the service manual enables a user to obtain a remote desktop from a remote workstation in the workstation sharing pool and display the obtained remote desktop on a local screen of their local workstation. An obtained remote desktop enables a user to interact with a remote workstation in the workstation sharing pool by selecting items on the remote desktop. The STOP-ACCESS selection pops up to stop an open remote desktop session.

The DELEGATION selection of the service manual enables a user to push a remote desktop obtained from one remote workstation in the workstation sharing pool onto another remote workstation in the workstation sharing pool. The STOP DELEGATION selection stops a delegation between two remote workstations.

The GET-ALL selection of the service manual enables a user to obtain a list of all of the workstations that are currently the workstation sharing pool. The workstations in the workstation sharing pool are presented to a user in a table form.

In one embodiment, communication between the client agents 20-28 and the management server 50 via the network 10 is based on request/response model of remote procedure calls (RPC) using the simple object access protocol (SOAP) which is an XML-based protocol. The SOAP RPC on the top of http mechanism enables the client agents 20-28 to penetrate through any firewall in the network 10 by using the public http port to access a remote desktop.

The client agents 20-28 digitally sign all requests that are sent to the management server 50 and the digital signatures are used for authentication purposes. In one embodiment, the management server 50 returns a credential to each client agent 20-28 after an initial successful login. The credentials are then used by the client agents 20-28 for signing all subsequent requests to the management server 50.

The workstation agents 30-38 each implement a light weight http server that only accepts requests from the management server 50 and the workstations that are authorized by the management server 50. The workstation agents 30-38 provide support for SOAP RPC. The SOAP RPC protocol is used to encode information exchange between the workstation agents 30-38 and the management server 50 and workstations authorized by the management server 50.

The workstation agents 30-38 enable the execution of applications on the corresponding workstations 40-48. The workstation agents 30-38 provide application start, application stop, application control, and application monitoring functionality. Each workstation agent 30-38 also provides as needed a remote desktop sharing server for supporting desktop sharing. The remote desktop sharing servers push the local desktops forward to remote desktop sharing clients in the client agents 20-28.

Each workstation agent 30-38 keeps track of any corresponding run-time application threads on the corresponding workstation 40-48 and monitors system resource utilization in the corresponding workstation 40-48. The workstation agents 30-38 also provide file management functionality and can traverse the directory trees, create directories and files on the corresponding workstations 40-48, and read/write files on the corresponding workstations 40-48 on behalf of a remote peer via an RPC application programming interface (API).

The management server 50 is the central workstation management component of the present system architecture. For scalability, the management server 50 may be replicated over the wide-area of the geographically dispersed workstations 40-48 so that the global management is reached by the cooperation among a group of management servers. The cooperation may be facilitated by the directory server 52.

In one embodiment, the management server 50 is implemented as a multi-threading process with SOAP based RPC API. The management functionalities of the management server 50 include user account management, workstation management, and applications management.

The user account management functions of the management server 50 include user account creation, user account deletion, and user account query. A user account class in one embodiment includes the following fields: user name, password, group ID, privilege, and description. Users include ordinary users and administrators. An administrator may access user account management functions, workstation management functions, and applications management functions of the management server 50. An ordinary user may only access workstations and applications without privilege to do any management functionalities.

The management server 50 includes a workstation check-in function and work station check-out function. The workstation check-in and check-out functions are two synchronized functions for maintaining consistency in workstation information contained in the directory server 52. The workstation sharing agents perform remote procedure calls to the check-in and check-out functions of the management server 50 to check-in and check-out their corresponding workstations 40-48 in and out of the workstation sharing pool in response to menu selections from the users of the workstations 40-48.

The management server 50 provides a function that enables a user to query the shared workstation pool and select workstation resources. For remote desktop sharing, the management server 50 includes two types of sharing functions including remote desktop access where a user locally accesses the desktop of a remote workstation and desktop delegation where a user causes the management server 50 to push the desktop of a remote workstation onto another remote workstation. The desktop delegation function includes the delegation of access rights.

The management server 50 also includes a set of basic file management functions that enable a user to traverse the directory tree of a remote workstation and do perform file copying transparently. These file management functions in one embodiment are implemented using a SOAP based RPC application programming interface (API) on each of the workstations 40-48.

The management server 50 keeps track of the registered applications that the users of the workstations 40-48 may remotely invoke. The management server 50 also includes functions for registering applications and for deregistering applications that may be remotely invoked.

In one embodiment, the management server 50 enforces security using an SSL-based login session, signed requests, and access control. When a user initially performs a login, the password and login name provided by the user are passed to the management server 50 by a client agent using an https session. Thereafter, all requests from that user are signed with the credential returned by the management server 50 to the client agent of the user in the login session. For protection of each workstation 40-48 in the sharing pool, access control lists are maintained by the workstation agents 30-38. Each workstation agent 30-38 verifies each request to a workstation against the corresponding access control list.

The directory server 52 may be held in a persistent storage in a local file system of one or more of the workstations 40-48 or on a separate workstation. In one embodiment, the directory server 52 maintains user account information and workstation information using the Java HasMap class. The HasMap class enables fast key-based information retrieval. The front end of the directory server 52 is a SOAP RPC based http server that performs directory access.

Figure 3:
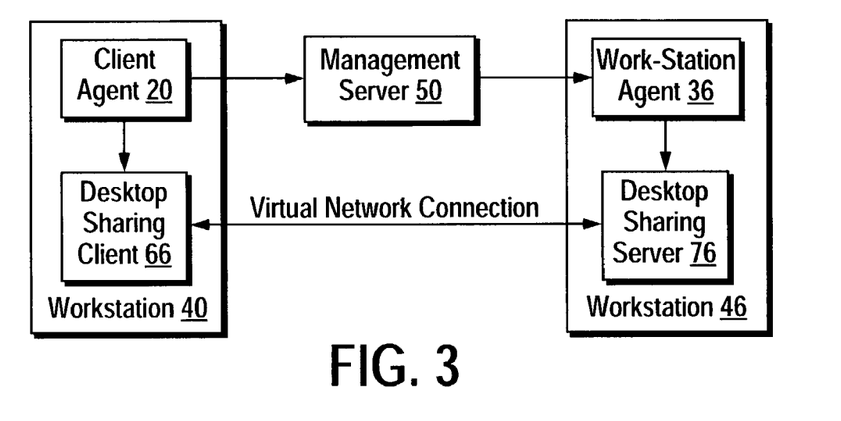
FIG. 3 illustrates desktop sharing between a pair of workstations in a workstation sharing pool.

FIG. 3 illustrates desktop sharing between a pair of workstations in a workstation sharing pool. In this example, the workstation 40 accesses a remote desktop from the workstation 46.

A user of the workstation 40 makes an ACCESS selection in the service manual of the graphical user interface generated by the client agent 20 on a local display of the workstation 40. In response to the ACCESS selection, the client agent 20 launches a desktop sharing client 66 on the workstation 40 and sends an access remote workstation request to the management server 50. The desktop sharing client 66 enables a remote workstation in the workstation sharing pool to send a remote desktop back to the client agent 20. The remote workstation access request sent to the management server 50 identifies the remote workstation 46 as the target of the request.

In response to receipt of the remote workstation access request, the management server 50 performs the appropriate security checks and forwards the remote workstation access request to the workstation agent 36 in the workstation 46.

In response to receipt of the forwarded remote workstation access request, the workstation agent 36 launches a desktop sharing server 76. The desktop sharing server 76 services desktop sharing requests from the desktop sharing client 66 in the workstation 40. The desktop sharing client 66 and the desktop sharing server 76 establish a VNC-like communication channel via the network 10 that enables the transfer of frame buffer display information for a local display of the workstation 46 to the workstation 40 and the transfer of user input information from the user input devices of the workstation 40 to the workstation 46.

Figure 4:
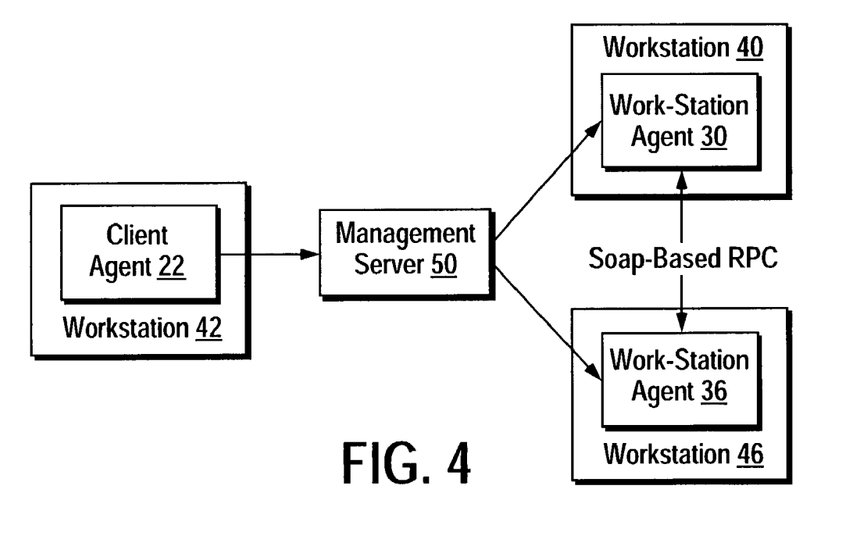
FIG. 4 illustrates a file copy operation between a pair of workstations in a workstation sharing pool.

FIG. 4 illustrates a file copy operation between a pair of workstations in a workstation sharing pool. In this example, the workstation 40 copies a file to the workstation 46.

A user of the workstation 42 in this example initiates the file copy operation by making an FILE COPY selection in the service manual of the graphical user interface generated by the client agent 22 on a local display of the workstation 42. In response to the FILE COPY selection, the client agent 22 sends a file copy request to the management server 50. The file copy request identifies the workstation 40 as the source of the file copy and the workstation 46 as the destination of the file copy and identifies the file that is to be copied.

In response to receipt of the file copy request from the client agent 22, the management server 50 performs the appropriate security check and sends messages to the workstation agents 30 and 36 in the workstations 40 and 46, respectively, that trigger the file copy.

In response to the triggering messages, the workstations 40 and 46 perform a file copy operation via the network 10. The file copy operation in one embodiment is performed between the workstation agents 30 and 36 using a SOAP-based RPC protocol for file exchange. The workstation agents 30 and 36 include functionality for reading and writing files on the file systems of the corresponding workstations 40 and 46.

Figure 5:
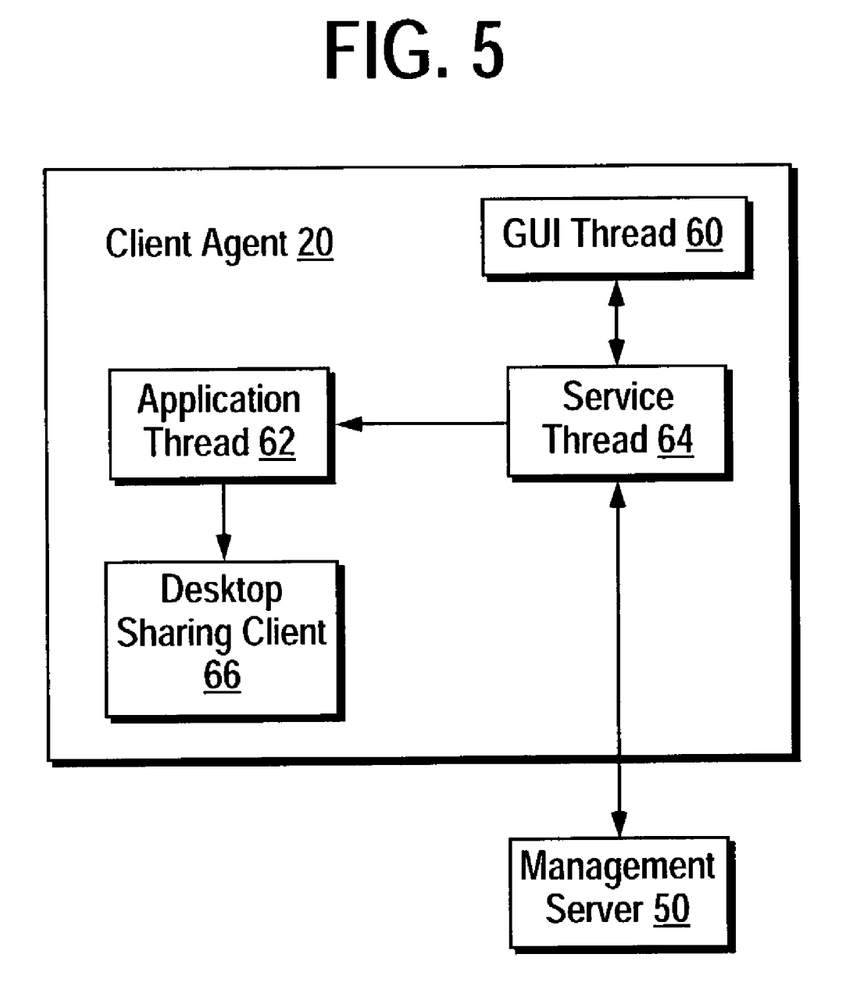
FIG. 5 shows one embodiment of a client agent according to the present teachings.

FIG. 5 shows one embodiment of a client agent, e.g. the client agent 20, according to the present teachings. The client agent 20 includes a graphical user interface (GUT) thread 60, a service thread 64, and an application thread 62.

The GUT thread 60 provides a graphical user interface to users of the workstation 40 including a main manual bar and a main table window with a file manual, a service manual, and an admin manual as described above.

The service thread 64 runs concurrently with the GUT thread 60 and transfers information between the GUT thread 60 and the management server 50. The service thread 64 transfers requests to the management server 50 in response to selections made by users via the GUT thread 60.

For example, the service thread 64 sends a remote workstation access request to the management server 50 when a user makes an ACCESS selection via the GUT 60. Similarly, the service thread 64 sends a file copy request to the management server 50 when a user makes an FILE-COPY selection via the GUT 60. A GET-ALL selection in the service manual by a user causes the service thread 64 to obtain a list of all workstations currently in the workstation sharing pool from the management server 50 and display the list to the user of the workstation 40.

In one embodiment, communication between the service thread 64 and the management server 50 is based on a SOAP RPC mechanism. The service thread 64 digitally signs all requests that are sent to the management server 50.

An ACCESS selection in the service manual of the GUI thread 60 by a user of the workstation 40 causes the GUI thread 60 to send a remote workstation access request to the service thread 64. In response to receipt of the remote workstation access request, the service thread 64 starts the application thread 62. The application thread 62 in turn launches the desktop sharing client 66 on the workstation 40. The desktop sharing client 66 enables a remote workstation in the workstation sharing pool to send a remote desktop back to the client agent 20. The application thread 62 is active during the period of a remote desktop access session. The application thread 62 has the capability of starting and stopping the desktop sharing client 66, and monitoring and controlling remote desktop sessions. Remote desktop accessing sessions in one embodiment do not interact with the management server 50.

In one embodiment, the client agent 20 is a pure java application with the exception of the remote desktop sharing client 66 which is VNC-like software.

Figure 6:
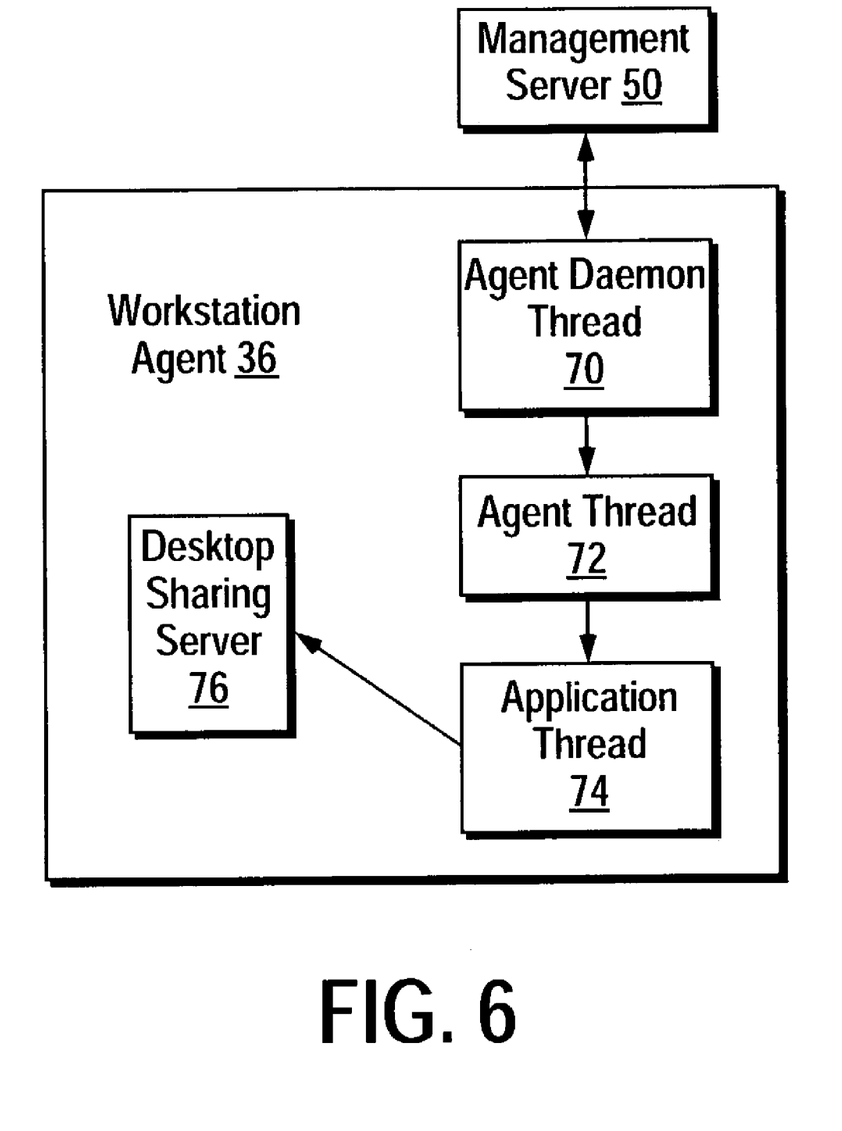
FIG. 6 shows components of a workstation agent in one embodiment.

FIG. 6 shows a workstation agent, e.g. the workstation agent 36, in one embodiment. The workstation agent 36 is based on a single process multi-threading arrangement with multiple concurrent threads working together including an agent daemon thread 70, an agent thread 72, an application thread 74.

The agent daemon thread 70 is the service communication component of the workstation agent 36. The agent daemon thread 70 is a light weight http server that only accepts requests from the management server 50 and the workstations that are authorized by the management server 50. The agent daemon thread 70 provides support for SOAP based RPC.

The agent thread 72 is a work dispatching thread that spans application threads in the workstation agent 36 to handle service requests. The agent thread 72 keeps track of run-time application threads and monitors system resource utilization in the workstation 46. The agent thread 72 also provides file management functionality and can traverse the directory trees, create directories and files on the workstation 46, and read/write files on the workstation 46 on behalf of a remote peer via an RPC application programming interface (API).

The application thread 74 provides for the execution of an application on the workstation 46. The application thread 74 provides application start, stop, control, and monitoring functionality. The application thread 74 starts the remote desktop sharing server 76 for supporting desktop sharing. The remote desktop sharing server 76 is started by the application thread 74 using Java native interface. The remote desktop sharing server 76 pushes the local desktop of the workstation 46 forward to the remote desktop sharing client 66 of the client agent 20.

The agent daemon thread 70, the agent thread 72, and the application thread 74 are all active in a process and are pure Java programs so that the workstation agent 36 can run on any platform or device having a Java virtual machine.

The present architecture may be deployed in a variety of arrangements on a variety of platforms. For example, a client agent, a management server, a directory server, and a workstation agent may be loaded from computer readable storage media and may be deployed on a single workstation by being loaded onto tangible computer readable storage media of the workstation. A management server, a directory server, and a client agent may be deployed on a workstation for a single user. For easing installation, a client agent and a workstation agent may be put in a web-server for a user to download. The same web server may also host a management server. The client and workstation agents may be downloaded using web protocols by a web browser executing in a workstation. In addition, an execution environment, for example a Java virtual machine, may be downloaded from a management server or some other server.

The present teachings provide a pure Java based portable middleware architecture that can run on any computers and devices that include a Java virtual machine. The architecture enables aggregation of a variety of heterogeneous computers into a shared pool and management of the computers in the pool. The use of communication based on SOAP RPC enables a wide range of services and the integration of the present architecture with existing and future XML-based services, e.g. UDDI.

The code that implements the present architecture consumes relatively little storage space and may be deployed in a variety of different environments. The present component based architecture enables extensibility. The present techniques seamlessly provide remote desktop sharing in a user-transparent way among a group of geographically distributed workstations. Directory browsing and file transfer may be performed between any two heterogeneous workstations.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A workstation sharing system, comprising:
a set of heterogeneous workstations each executing a set of cross-platform code that provides a corresponding workstation sharing agent and a client agent;
management server that enables the workstation agents to formulate a workstation sharing pool for resource sharing among the heterogeneous workstations wherein the management server and the workstation agents communicate using a protocol that is selected to enable the heterogeneous workstations to be widely dispersed geographically and communicate via a network and wherein the client agent of each of the heterogeneous workstations is configured to present a selection function to a user of the workstation, the selection function is used by the workstation to push a remote desktop obtained from a first remote workstation in the workstation sharing pool onto a second remote workstation in the workstation sharing pool, the remote desktop is configured to be used by the user to interact with the first remote workstation, and the first and second remote workstations are different from the workstation.

2. The workstation sharing system of claim 1, wherein each heterogeneous workstation includes a virtual machine for executing the cross-platform code.

3. The workstation sharing system of claim 1, wherein a remote procedure call protocol is used for communication among the workstation agents and the management server via the network.

4. The workstation sharing system of claim 3, wherein the protocol is selected such that the remote procedure calls penetrate any firewalls in the network.

5. The workstation sharing system of claim 1, wherein the management server is configured to return a credential to each of the heterogeneous workstations after an initial successful login of the workstation at the management server and the credential is used by the workstation for signing subsequent requests to the management server.

6. The workstation sharing system of claim 1, wherein the management server enables the workstation sharing agents to check in the corresponding heterogeneous workstations into the workstation sharing pool.

7. The workstation sharing system of claim 1, wherein the management server enables the workstation sharing agents to check out the corresponding heterogeneous workstations from the workstation sharing pool.

8. The workstation sharing system of claim 1, wherein the management server enables the workstation sharing agents to query the heterogeneous workstations that are currently available in the workstation sharing pool.

9. The workstation sharing system of claim 1, wherein the management server enables the workstation sharing agents to share remote desktop information among the heterogeneous workstations in the workstation sharing pool.

10. The workstation sharing system of claim 1, wherein the management server enables the workstation sharing agents to share files among the heterogeneous workstations in the workstation sharing pool.

11. A method for workstation sharing, comprising:
obtaining a workstation sharing agent and a client agent for a workstation;
executing the workstation sharing agent such that the workstation sharing agent performs resource sharing among a set of heterogeneous workstations that include the workstation;
presenting a selection function to a user of the workstation; and
in response to a selection by the user of the selection function, pushing a remote desktop obtained from a first remote workstation of the heterogeneous workstations onto a second remote workstation of the heterogeneous workstations, wherein the remote desktop is configured to be used by the user to interact with the first remote workstation and the first and second remote workstations are different from the workstation.

12. The method of claim 11, wherein obtaining a workstation sharing agent comprises downloading the workstation sharing agent.

13. The method of claim 12, wherein downloading the workstation sharing agent comprises downloading the workstation sharing agent from a management server.

14. The method of claim 11, further comprising downloading an execution environment for the workstation sharing agent.

15. The method of claim 14, wherein downloading an execution environment comprises downloading a virtual machine.

16. The method of claim 11, wherein obtaining a workstation sharing agent comprises loading the workstation sharing agent from a computer-readable storage media.

17. A tangible computer readable storage media that holds a set of cross platform code that when executed on a workstation performs resource sharing by:
communicating with a management server via a network using a protocol that is selected to enable the workstation to be widely dispersed geographically with respect to a set of heterogeneous workstation in a workstation sharing pool;
performing a remote procedure call to a function in the management server that checks-in the workstation into the workstation sharing pool;
presenting a selection function to a user of the workstation; and
in response to a selection by the user of the selection function, pushing a remote desktop obtained from a first remote workstation in the workstation sharing pool onto a second remote workstation in the workstation sharing pool, wherein the remote desktop is configured to be used by the user to interact with the first remote workstation and the first and second remote workstations are different from the workstation.

18. The tangible computer readable storage media of claim 17, wherein the cross-platform code is adapted for execution under a virtual machine of the workstation.

19. The tangible computer readable storage media of claim 17, wherein the protocol is selected such that the remote procedure call penetrates any firewalls in the network.

20. The tangible computer readable storage media of claim 17, further comprising performing a remote procedure call to a function in the management server that checks-out the workstation from the workstation sharing pool.

21. The tangible computer readable storage media of claim 17, further comprising performing a remote procedure call to a function in the management server that queries the heterogeneous workstations that are currently available in the workstation sharing pool.

22. The tangible computer readable storage media of claim 17, further comprising performing a remote procedure call to a function in the management server that creates a remote desktop sharing channel with one of the heterogeneous workstations in the workstation sharing pool.

23. The tangible computer readable storage media of claim 17, further comprising performing a remote procedure call to a function in the management server that creates a file sharing operation with one of the heterogeneous workstations in the workstation sharing pool.

* * * * *